April 28, 1959     W. STELZER     2,883,970
CLOSED SYSTEM HYDRAULIC MOTOR
Filed April 12, 1957     3 Sheets-Sheet 1

INVENTOR
WILLIAM STELZER
BY John H. Phillips
ATTORNEY

April 28, 1959 W. STELZER 2,883,970
CLOSED SYSTEM HYDRAULIC MOTOR
Filed April 12, 1957 3 Sheets-Sheet 3

INVENTOR
WILLIAM STELZER
John V. Phillips
ATTORNEY

United States Patent Office 2,883,970
Patented Apr. 28, 1959

2,883,970

CLOSED SYSTEM HYDRAULIC MOTOR

William Stelzer, Bloomfield Hills, Mich., assignor to Kelsey-Hayes Company, Detroit, Mich., a corporation of Delaware Application April 12, 1957, Serial No. 652,433

6 Claims. (Cl. 121—41)

This invention relates to a hydraulically operated booster brake mechanism, and more particularly to such a mechanism adapted to be supplied with power from a source of static hydraulic pressure such as an accumulator.

An important object of the invention is to provide a booster of the character referred to embodying a novel type of hydraulic motor having means for providing two stages of brake pedal reaction, a low reaction being provided at the beginning of the pedal stroke and a higher reaction occurring during later stages of brake actuation.

A further object is to provide such an apparatus wherein the hydraulic motor embodies a piston unit in which are mounted the means for providing the reaction against the brake pedal.

A further object is to provide such an apparatus wherein the piston unit has mounted therein a normally inoperative device adapted to provide a second stage of pedal reaction and which device automatically comes into operation when predetermined hydraulic pressures are developed in the associated master cylinder.

A further object is to provide such an apparatus wherein the hydraulic motor is directly connected to the rear end of the master cylinder to directly apply axial forces from the hydraulic motor piston to the master cylinder plunger.

A further object is to provide such an apparatus wherein substantially all of the parts are arranged coaxially throughout the motor, thus providing for a balancing of all forces transmitted axially through the mechanism.

A further object is to provide an apparatus of this character wherein the valve parts are so formed as to provide for normally balanced pressures affecting them to prevent any pressures from being applied to the valve elements tending to move them from the positions in which they are arranged.

A further object is to provide such a booster brake mechanism wherein the hydraulic motor and master cylinder may be fixed together as a unit and mounted directly against the forward face of the fire wall of the vehicle.

Other objects and advantages of the invention will become apparent during the course of the following description.

In the drawings I have shown one embodiment of the invention. In this showing:

Figure 1:
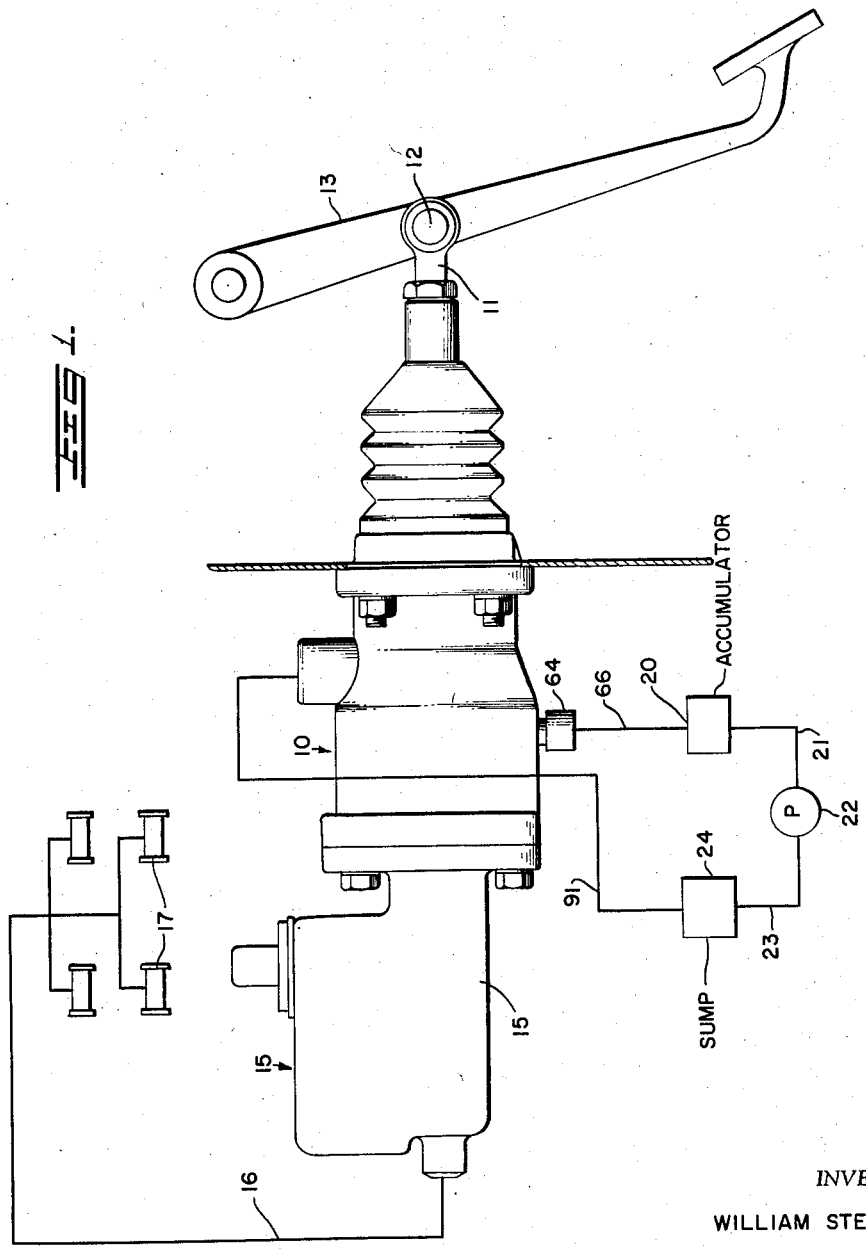
Figure 1 is a side elevation of the apparatus, a portion of the vehicle fire wall being shown in section and parts of the system being diagrammatically represented.

Referring to Figure 1, which shows the system as a whole, the numeral 10 designates a hydraulic motor adapted to be controlled through movement of an axial rod 11 connected as at 12 to a brake pedal 13 shown in the present instance as being of the depending type. Forwardly of the motor is arranged a conventional master cylinder 15 having connection through lines 16 with the usual wheel cylinders 17 of the motor vehicle.

The present mechanism is adapted to be operated from a source of static pressure, for example from an accumulator 20 supplied with hydraulic fluid under pressure through a line 21 from a pump 22. Fluid is supplied to this pump through a line 23 leading from a sump 24.

Figure 2:
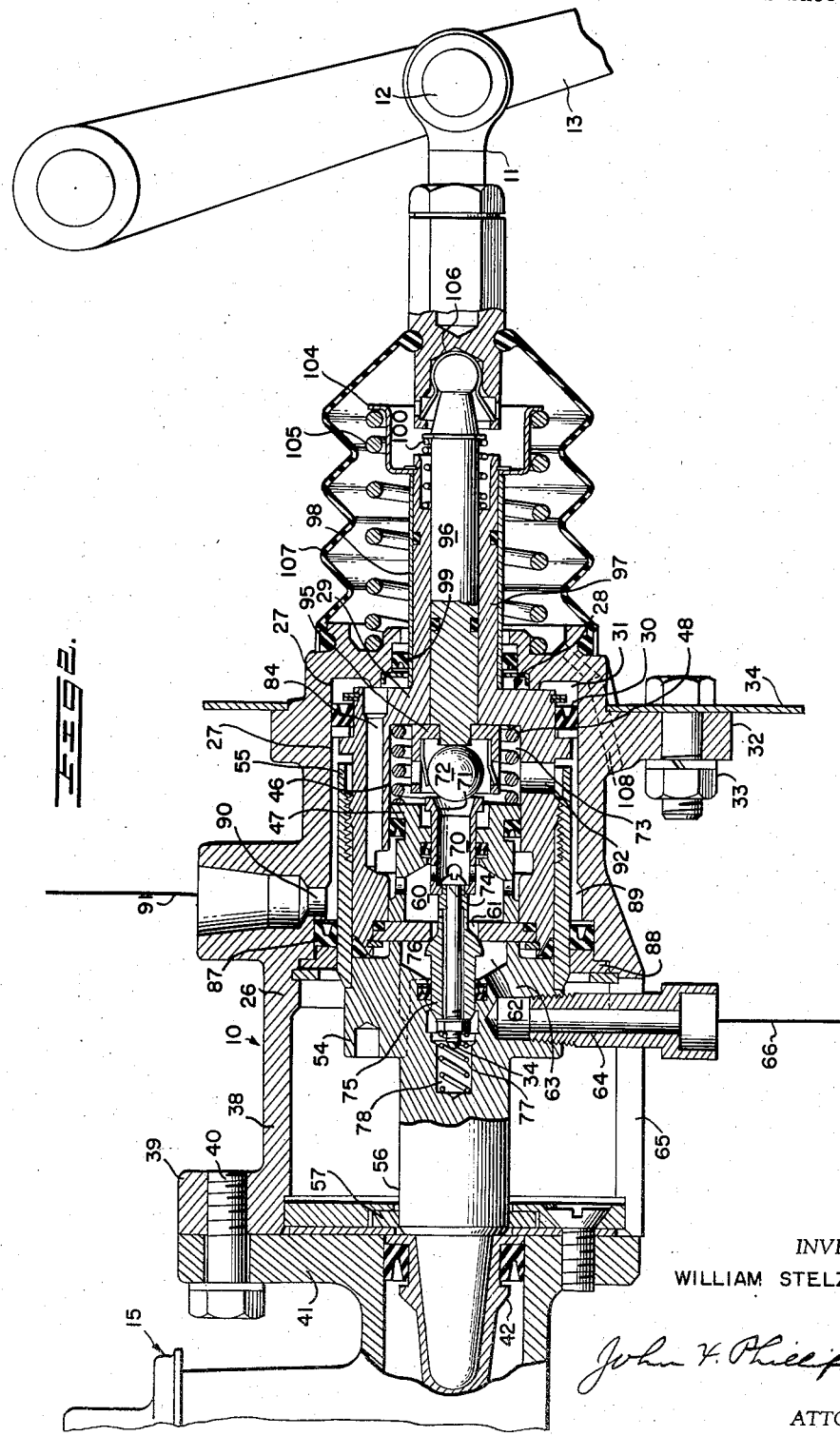
Figure 2 is an enlarged axial sectional view through the motor and associated parts, some of the elements being broken away, the parts being shown in normal positions.
Figure 3:
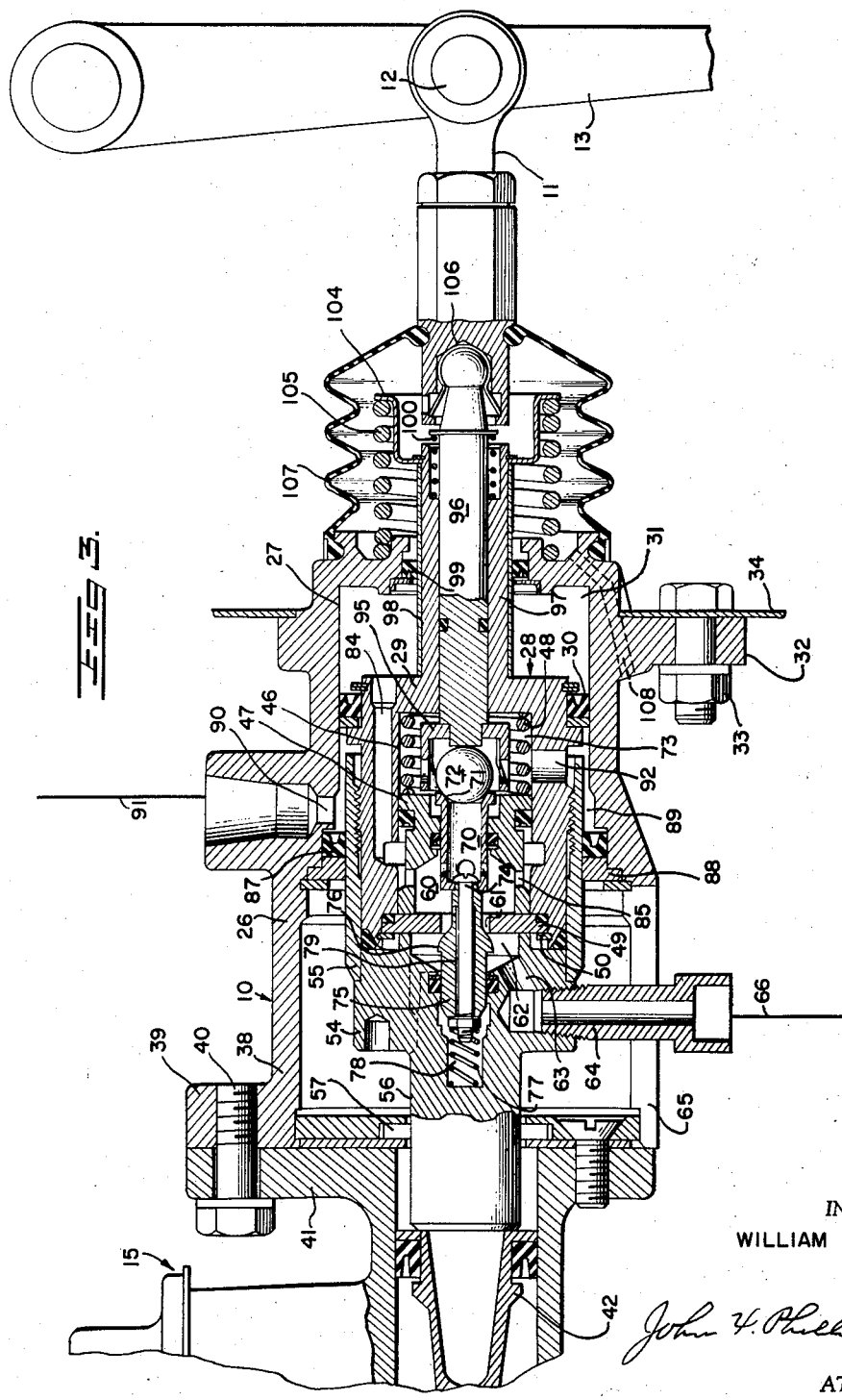
Figure 3 is a similar view showing the parts in operative positions.

Referring to Figures 2 and 3, the motor 10 comprises a housing 26 having a bore 27 in one end, in which is slidable a piston unit indicated as a whole by the numeral 28. The piston unit comprises a body 29 sealed in the bore or cylinder 27 as at 30 and forming with the adjacent end of the housing 26 a pressure chamber 31 in which pressure is established in a manner to be described to effect movement of the piston unit 28 to the left as viewed in Figure 2. The body 26 is flanged at its rear end as at 32 and bolted as at 33 to the vehicle fire wall 34.

The forward end of the body 26 is enlarged as at 38 and the forward end of such enlargement is flanged as at 39 to be fixed as at 40 to the body 41 of the master cylinder. This master cylinder is provided therein with a conventional fluid displacing plunger 42 from which fluid is forced through lines 16 to the wheel cylinders as will be apparent.

The piston body 29 is provided therein with a bore 46 in which is slidable a reaction plunger 47. The reaction plunger 47 is biased forwardly by a spring 48 and is limited in such forward movement by a valve seat disk 49 held in position by a snap ring 50.

A force transmitting body 54 is arranged axially forwardly of the piston body 29 and fits within a sleeve 55 surrounding and having threaded connection with the piston body 29 as shown. The body 54 is provided with a reduced forwardly extending axial projection 56 having abutting engagement with the master cylinder plunger 42 and slidable through a seal 57. It will be apparent that upon movement of the piston unit 28 to the left, force will be transmitted to the master cylinder plunger 42 to displace fluid from the master cylinder.

The forward end of the plunger body 47 is provided with a chamber 60 communicating through an axial opening 61 in the valve seat disk 49 with a forward chamber 62. This chamber communicates through a port 63 with a nipple 64 extending radially through an opening 65 formed in the enlarged portion 38 of the body 26 and adapted for connection with a flexible hose forming a line 66 (Figure 1) connected to the outlet of the accumulator 20.

A tubular valve seat member 70 is slidable through the reaction member 47 in sealed relation thereto and is provided at its rearward end with a valve seat 71 engageable by a ball valve 72. The interior of the valve seat member 70 communicates at all times with the chamber 60. The parts are shown in Figure 3 in a partially brake applied condition with the valve 72 closed. This valve is normally open as in Figure 2 and, accordingly, the opening through the seat member 70 normally communicates with a chamber 73 formed in the piston body 29.

A valve body 75 is slidably mounted in the force transmitting body 54 and is provided in the chamber 62 with a valve 76 engageable with the forward end of the axial opening 61. The valve 76 is normally closed and is biased to closed position by a spring 77 arranged in a chamber 78 formed in the body 54. The valve body 75 is fixed to the valve seat member 70 by a bolt 74 and the opening through which this bolt extends is enlarged as at 79 to afford communication between the chambers 60 and 78 to balance pressures affecting the valve body 75. The diameter of the valve body 75 is preferably equal to the diameter of the opening 61 to balance pressures affecting the valve body 75.

The chamber 60 communicates through a passage 84 with the motor pressure chamber 31 and also communicates with the chamber 60 through ports 85 extending through the reaction plunger 47. The piston body 29 is sealed as at 30 with respect to the bore 27, as stated. The sleeve 55 is sealed with respect to the motor body as at 87. This seal engages against a bearing 88 for the sleeve 55. It will be noted that the external diameter of the sleeve 55 is less than the diameter of the bore 27, thus providing an annular space 89 in fixed communication through a port 90 with a line 91 (Figure 1) for the return of hydraulic fluid to the sump 24 when the brakes are released. The annular space 89 communicates with the chamber 73 through a port 92.

The ball valve 72 is mounted in a cup 95 carried by the forward end of a push rod 96. This push rod is axially slidable through a rearwardly extending tubular member 97 formed integral with the piston body 29 and preferably surrounded by a stainless steel sleeve 98. This sleeve extends rearwardly through a seal 99 carried by the right-hand end of the motor body 26. The push rod 96 is biased rearwardly by a light spring 100.

The rear end of the tubular extension 97 carries a spring seat 104, and a return spring 105 is arranged between this seat and the rear end of the motor body 26 to bias the piston unit 28 rearwardly to its normal off position. The rear end of the push rod 96 is mounted in a socket 106 carried by the pedal operable rod 11. A protective boot 107 is connected between the pedal operable rod 11 and the motor body 26, and the space within the boot may be vented to the atmosphere through a suitable port 108.

Operation

The parts normally occupy a position with the piston body 29 at its right-hand limit of movement in Figure 2 against the adjacent end wall of the body 26. The cup 95 will be in engagement with the wall at the right-hand end of the chamber 73, and the valve 72 will be open. The valve 76 will be seated and accordingly static pressure, provided from the accumulator 20, will exist in the line 66 and thus in the chamber 62. This chamber will be cut off from the chamber 60 by the closing of the valve 76. The ball valve 72 being open, the motor pressure chamber 31 will communicate through passage 84, ports 85, chamber 60, the interior of the valve seat member 70, chamber 73 and port 92 with the annular chamber 89, which is always in communication with the sump 24 through line 91. Accordingly atmospheric pressure will exist in the chamber 31.

When the brakes are to be operated, the pedal 13 will be depressed, thus moving the push rod 96 toward the left in Figure 2 to seat the valve 72 against the valve seat 71. This action disconnects the chamber 73 from the chamber 60, and the valves will now be in lap position. Slight further movement of the push rod 96 will impart movement through the valve 72 to the valve seat 70, and such movement will be directly transmitted to the valve body 75 to open the valve 76. The parts will now be in the positions shown in Figure 3 and brake operation will take place.

The valve 76 now being opened, hydraulic pressure will be supplied through the opening 61 to the chamber 60 and thence through passage 84 into the chamber 31, and the entire piston unit 28 will move to the left, for example to the position shown in Figure 3. Movement of the piston unit will be transmitted to the master cylinder plunger 42 to displace fluid into the brake lines.

At this point, it will be noted that pressure in the chamber 60, while cut off from the chamber 73, will act against the ball 72 to transmit a relatively low reaction to the brake pedal. The line of engagement of the ball 72 with its seat 71 is equal to the external diameter of the valve seat member 70, hence pressures in the chamber 73, acting on the valve seat member 70, will be balanced. As previously stated, the line of engagement of the valve 76 with its seat is equal in diameter to the valve body 75. Accordingly, when the valve 76 was closed, pressures in the chamber 62 affecting the valve 76 were balanced. The external diameter of the valve seat member 70 being substantially equal to the diameter of the opening 61, oppositely acting pressures in the chamber 60 affecting the valve 76 when it was closed also will be substantially equalized. When the valve 76 is opened, pressure is equalized in the chambers 60 and 62 and such pressure is communicated through passage 79 to the chamber 78 and it will be apparent that the structure including the members 70 and 75 will be subjected to balanced pressures.

As previously stated, reaction is transmitted to the brake pedal under the conditions illustrated in Figure 3 by pressure acting against the ball 72. Sufficient pedal pressure is necessary to overcome this reaction, as will be obvious. Such pressure must be maintained and increased to continue the operation of the piston unit 28 to the left. Accordingly, the relatively low reaction forces during initial brake operation will progressively increase as pressures are built up in the chamber 60 and in the motor chamber 31. Any relieving of the pressure against the brake pedal will release pressure from the interior of the seat member 70 into the chamber 73 to arrest further movement of the piston unit 28. The mechanism described therefore serves to provide a perfect follow-up action of the piston unit 28 relative to the brake pedal.

It is highly desirable in a booster brake mechanism to provide a relatively low reaction ratio during initial stages of brake operation and relatively high reaction ratios in later stages of brake operation. Up to the point of operation in the apparatus as shown in Figure 3, the left-hand end of the reaction plunger 47 will have remained in engagement with the valve seat disk 49, being held in such position by the spring 48. Accordingly, the reaction plunger 47 up to this point will have moved as a unit with the piston body 29. As the pressure increases in the master cylinder, increased motor operating pressures are required as will be apparent, and accordingly pressures in the chamber 60 will reflect and be proportionate to pressures in the master cylinder. When the latter pressure reaches a predetermined point, for example between 40 and 70 p.s.i., the pressure in the chamber 60 will increase to the point necessary to overcome the loading of the spring 48.

Up to the point illustrated in Figure 3, it will be noted that the left-hand end of the cup 95 will be slightly spaced from the adjacent end of the reaction plunger 47. As soon as pressure in the chamber 60 increases to the predetermined point referred to, the play between the cup 95 and reaction plunger 47 will be taken up, this plunger moving to the right of the position shown in Figure 3 away from the valve seat disk 49. Whereas the previous reaction was limited to the area of the line of contact of the ball 72 with the seat 71, the reaction area now becomes the diameter of the reaction plunger 47. Therefore reaction pressures will be substantially increased in the later stages of brake operation, as is highly desirable.

The maximum brake application is determined by the operator's ability to exert force against the brake pedal 13. Beyond the point of operation of the mechanism just described, a point of power run-out of the hydraulic motor will occur, that is, the point at which maximum pressures in the motor chamber 31 can no longer increase pressures in the master cylinder. Therefore the application of increased forces against the brake pedal will cause the reaction member 47 to be moved by the cup 95 back into engagement with the valve seat disk 49, and after this point is reached, direct pedal pressures will be transmitted through the extension 56 to the master cylinder plunger 42.

The brakes are released by releasing the brake pedal 13 as will be apparent. As soon as this action takes place, the pressure in the chamber 60 will unseat the ball 72, thus relieving pressure from the motor chamber 31 through passage 84 and chamber 60 into the chamber 73. The valve 76 will be closed by the spring 77 and the fluid in the chamber 31 will be returned to the sump around the ball 72 and through the chamber 73 and port 92. The spring 48 obviously will return the reaction member to its normal position in engagement with the valve seat 49, and the return spring 105 will return the piston unit 28 to its normal position referred to.

It will be apparent that the piston unit contains all of the motor control valving as well as the devices for providing the two stages of pedal reaction described above. The opening 65 is elongated parallel to the axis of the motor to provide the necessary space for the travel of the nipple 64, as will be obvious.

Assuming that there is a failure of power for the motor, that is, if there is no pressure present in the accumulator 20, the brakes may be operated directly by pedal pressure. Under such conditions, the operation of the push rod 96 to open the valve 76 will not result in motor operation and the left-hand edge of the cup 95 in Figure 2 will quickly move into engagement with the reaction plunger 47. Direct pedal pressures then will be applied through the plunger 47 to the relatively fixed elements of the piston unit and thus to the master cylinder piston 42 to operate the brakes by pedal pressure.

It will be noted that all of the elements of the apparatus which affect its operation and through which any forces are transmitted are coaxially arranged to maintain the exact balance of forces coaxially relative to the motor, thus relieving all of the parts from any lateral or angular strains. The parts are relatively simple and the entire piston unit may be assembled as a unit prior to installation of such unit in the motor body 38.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A closed system hydraulic motor comprising a cylinder, a piston unit slidable in said cylinder and forming with one end thereof a pressure chamber, an axial chamber in said piston unit communicating with a pressure relief outlet, a tubular valve seat member slidable in said piston unit and having a valve seat opening into said axial chamber, a normally open valve engageable with said seat, a pair of chambers in said piston unit, a second valve seat dividing the chambers of said pair, one chamber of said pair communicating with the interior of said tubular valve seat member and with said pressure chamber, a valve connected to said tubular member, such valve being arranged in the other chamber of said pair and normally engaging said second seat, means connecting said other chamber to a source of hydraulic pressure, reaction means normally movable with said piston unit, and operating means movable in one direction for closing said first-named valve and transmitting movement to said tubular valve seat member and to said second-named valve to open communication between the chambers of said pair, said operating means having a portion engageable with said reaction means to directly transmit force thereto to effect movement of said piston unit, said reaction means comprising a reaction plunger, and means biasing such plunger for movement in said direction, said plunger having pressure areas open to pressure in said one chamber whereby when said pressure increases to a predetermined point, said plunger will be moved in the other direction to engage said operating means to oppose movement thereof in said direction.

2. A motor according to claim 1 wherein said second valve seat forms an abutment normally engaged by said plunger to limit movement thereof in said one direction.

3. A closed system hydraulic motor comprising a cylinder, a piston unit slidable in said cylinder and forming with one end thereof a pressure chamber, said piston unit being provided between its ends with an annular space of substantial length, an outlet port communicating with said space, said piston unit being provided therein with an axial chamber communicating with said annular space, a tubular seat member slidable in said piston unit and having a first valve seat at one end communicating with said axial chamber, a normally open valve engageable with such seat, said piston unit being provided with a pair of chambers one of which communicates with said pressure chamber and with the interior of said tubular valve seat member, a second valve seat dividing the chambers of said pair, a valve in the other chamber of said pair normally engaging said second seat and connected to said tubular seat member, means connecting said other chamber with a source of hydraulic pressure, operating means for moving said first-named valve in one direction to engage and close said first seat and move said tubular seat member to transmit movement to said second-named valve to open said second valve seat to open the chambers of said pair to each other, a reaction plunger in which said tubular seat member is axially movable, said reaction plunger having an end opening into said axial chamber, and spring means biasing said reaction plunger for movement in said direction to a normal position, said reaction plunger having pressure areas open to pressure in said one chamber and being movable when such pressure increases to a predetermined point to move said reaction plunger in the other direction to engage it with said operating means and oppose movement thereof in said one direction.

4. A closed system hydraulic motor comprising a cylinder, a piston unit slidable in said cylinder and forming with one end thereof a pressure chamber, said piston unit being provided between its ends with an annular space of substantial length, an outlet port communicating with said space, said piston unit being provided therein with an axial chamber communicating with said annular space, a tubular seat member slidable in said piston unit and having a first valve seat at one end communicating with said axial chamber, a normally open valve engageable with such seat, said piston unit being provided with a pair of chambers one of which communicates with said pressure chamber and with the interior of said tubular valve seat member, a second valve seat dividing the chambers of said pair, a valve in the other chamber of said pair normally engaging said second seat and connected to said tubular seat member, means connecting said other chamber with a source of hydraulic pressure, operating means for moving said first-named valve in one direction to engage and close said first seat and move said tubular seat member to transmit movement to said second-named valve to open said second valve seat to open the chambers of said pair to each other, a reaction plunger mounted in said piston unit and having an end open to said axial chamber, and spring means biasing said plunger in said one direction to a normal position, said first-named valve comprising a ball, said operating means comprising a cup in said axial chamber in which said ball is arranged and provided with an open end spaced from said end of said reaction plunger, said plunger having pressure areas open to pressure in said one chamber whereby, upon an increase in such pressure to a predetermined point, said plunger will be moved in the other direction to engage said end of said cup to oppose movement thereof in said one direction.

5. In a motor mechanism for assisting a manually operable master cylinder of a hydraulic braking system, said motor mechanism being energizable by fluid under pressure from a source of fluid under pressure, in combination, a valve mechanism for controlling the flow of fluid to or from said motor mechanism, including a static pressure chamber in communication with said source of pressure, a low pressure chamber for discharging fluid to a lower pressure level, a control pressure chamber in communication with said motor mechanism, a passage leading from said static pressure chamber to said control chamber, a movable first valve adapted to close said passage, a conduit secured to and coaxial with said first valve to be movable therewith and extending from said control pressure chamber to said low pressure chamber to transmit fluid from said control pressure chamber to said low pressure chamber, said conduit having a valve seat, a second valve coaxial with said first valve and arranged to be seated on said valve seat, manually operable means coaxial with said valves and movable in one direction to urge said second valve to seat on said valve seat of said conduit to close off communication from said control pressure chamber to said low pressure chamber and to open said first valve, a reaction device, and a spring biasing said reaction device in said direction to a normal position, said reaction device having a surface exposed to pressure in said control chamber to be moved in the other direction upon an increase in pressure in said control chamber to a predetermined point, said reaction device having a portion engageable with said manually operable means to react against movement of the latter in said one direction when said reaction device moves in said other direction.

6. A mechanism according to claim 5 wherein said reaction device comprises a plunger slidable axially of said conduit and in which said conduit is axially slidable.

References Cited in the file of this patent

UNITED STATES PATENTS

| | | |
|---|---|---|
| 2,323,947 | Werff | July 13, 1943 |
| 2,410,269 | Chouings | Oct. 29, 1946 |
| 2,420,313 | Hall | May 13, 1947 |
| 2,427,567 | Martin | Sept. 16, 1947 |
| 2,470,746 | Schultz | May 17, 1949 |
| 2,775,957 | Anderson | Jan. 1, 1957 |